United States Patent
Chou et al.

(10) Patent No.: US 12,244,943 B2
(45) Date of Patent: Mar. 4, 2025

(54) HDR PLUS WITH MxN-CELL IMAGE SENSOR

(71) Applicant: CISTA SYSTEM CORP., Grand Cayman (KY)

(72) Inventors: Yang-Ting Chou, Zhubei (TW); Zhaojian Li, Fremont, CA (US)

(73) Assignee: Cista System Corp., Grand Cayman (KY)

( * ) Notice: Subject to any disclaimer, the term of this patent is extended or adjusted under 35 U.S.C. 154(b) by 121 days.

(21) Appl. No.: 18/195,208

(22) Filed: May 9, 2023

(65) Prior Publication Data
US 2024/0380994 A1 Nov. 14, 2024

(51) Int. Cl.
*H04N 25/57* (2023.01)
*G06T 5/10* (2006.01)
*G06T 5/50* (2006.01)
*G06T 5/70* (2024.01)
*G06T 5/92* (2024.01)
(Continued)

(52) U.S. Cl.
CPC ............ *H04N 25/57* (2023.01); *G06T 5/10* (2013.01); *G06T 5/50* (2013.01); *G06T 5/70* (2024.01); *G06T 5/92* (2024.01); *H04N 25/11* (2023.01); *H04N 25/62* (2023.01); *G06T 2207/10024* (2013.01); *G06T 2207/20064* (2013.01); *G06T 2207/20208* (2013.01); *G06T 2207/20221* (2013.01)

(58) Field of Classification Search
CPC ........ H04N 25/57; H04N 25/62; H04N 25/11; G06T 5/92; G06T 5/70; G06T 5/10; G06T 5/50; G06T 2207/10024; G06T 2207/20064; G06T 2207/20208; G06T 2207/20221

USPC ........................................................ 348/302
See application file for complete search history.

(56) References Cited

U.S. PATENT DOCUMENTS 8,228,560 B2 * 7/2012 Hooper ..................... G06T 5/94
  358/1.9
9,204,113 B1 * 12/2015 Kwok ...................... H04N 9/74
(Continued)

OTHER PUBLICATIONS

Antoine Monod et al., "An Analysis and Implementation of the HDR+ Burst Denoising Method", arXiv:2110.09354v1[eess.IV] Oct. 18, 2021, pp. 1-28.

(Continued)

*Primary Examiner* — Pritham D Prabhakher
(74) *Attorney, Agent, or Firm* — Sheppard Mullin Richter & Hampton LLP

(57) ABSTRACT

This application describes method and apparatus for HDR+ using MxN-cell sensors. An example apparatus includes a plurality of pixel groups, each pixel group having MxN pixels configured with color filters of a same color such that the MxN pixels in each pixel group capture a same color. M and N are integers greater than one, and each pixel is represented by a first number of bits. The example apparatus further include one or more processors configured to: capture, through the plurality of pixel groups, a plurality of frames of a scene using a short-exposure setting; merge the plurality of frames into an HDR image; and perform tone mapping on the HDR image to reduce a dynamic range of the super-pixels of the HDR image into a low dynamic range (LDR) image, wherein each pixel in the LDR image is represented with the first number of bits.

20 Claims, 8 Drawing Sheets

(51) Int. Cl.
    *H04N 25/11*     (2023.01)
    *H04N 25/62*     (2023.01)

(56) References Cited

U.S. PATENT DOCUMENTS

| | | | |
|---|---|---|---|
| 9,426,381 B1* | 8/2016 | Kwok | H04N 7/52 |
| 9,699,482 B2* | 7/2017 | Mertens | H04N 19/186 |
| 11,301,973 B2* | 4/2022 | Starkey | G06T 5/90 |
| 11,412,154 B2* | 8/2022 | McElvain | H04N 23/73 |
| 11,922,639 B2* | 3/2024 | Li | H04N 23/12 |
| 2012/0081578 A1* | 4/2012 | Cote | H04N 23/673 |
| | | | 348/E5.024 |
| 2015/0358646 A1* | 12/2015 | Mertens | H04N 9/68 |
| | | | 382/166 |
| 2018/0027216 A1* | 1/2018 | Bechtel | G06T 1/20 |
| | | | 348/148 |
| 2019/0035064 A1* | 1/2019 | Franklin | H04N 25/589 |
| 2019/0130543 A1* | 5/2019 | Kim | G06T 5/70 |
| 2021/0243352 A1* | 8/2021 | Mcelvain | H04N 25/583 |
| 2021/0248758 A1* | 8/2021 | Li | G06T 3/4015 |

OTHER PUBLICATIONS

Tim Brooks et al., "HDR+ Burst Processing Pipeline", Visual Computing Systems, Final Project; http://graphics.cs.cmu.edu/courses/15769/fall2016/. Apr. 29, 2017.

\* cited by examiner

600

610 capturing, using the MxN-cell image sensor, a plurality of frames of a scene using a short-exposure setting, wherein: the MxN-cell image sensor comprises a plurality of pixel groups, each pixel group having a MxN pixels configured with color filters of a same color such that the MxN pixels in each pixel group capture a same color, M and N are integers greater than one, and each pixel is represented by a first number of bits

620 merging the plurality of frames into an HDR image, wherein the merging comprises: identifying one pixel group from each of the plurality of frames; and merging the MxN pixels in each of the identified pixel groups into one super-pixel in the HDR image, wherein each super-pixel in the HDR image is represented by a second number of bits, the second number being greater than the first number

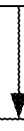

630 performing tone mapping on the HDR image to reduce a dynamic range of the super-pixels of the HDR image into a low dynamic range (LDR) image, wherein each pixel in the LDR image is represented with the first number of bits

FIG. 6

HDR PLUS WITH MxN-CELL IMAGE SENSOR

TECHNICAL FIELD

The disclosure relates generally to apparatus, system, and method for implementing HDR plus (HDR+) using M×N-cell image sensors.

BACKGROUND

Currently, high dynamic range (HDR) technology is increasingly significant in consumer cameras as it provides a greater amount of information in a picture, particularly in capture mode. Despite its popularity, the frame-based HDR algorithm and other similar techniques suffer from a time gap between various exposure images. This time delay can cause ghosting or blurring when the camera is shaken or objects are moving. Additionally, as each image's exposure level and noise are distinct, the fused image may contain a significant amount of noise. This patent presents a mechanism that can merge images with a greater dynamic range by utilizing the M×N-cell sensor's properties.

SUMMARY

Various embodiments of this specification may include hardware circuits, systems, and methods for implementing HDR plus (HDR+) using M×N-cell image sensors.

In some aspects, the techniques described herein relate to a computer-implemented method for High Dynamic Range (HDR) using M×N-cell image sensor, including: capturing, using the M×N-cell image sensor, a plurality of frames of a scene using a short-exposure setting. The M×N-cell image sensor includes a plurality of pixel groups, each pixel group having an M×N pixel configured with color filters of the same color such that the M×N pixels in each pixel group capture a same color, M and N are integers greater than one, and each pixel is represented by a first number of bits. The method may further include merging the plurality of frames into an HDR image, wherein the merging includes: identifying a pixel group from each of the plurality of frames; and merging the M×N pixels in each of the identified pixel groups into one super-pixel in the HDR image, wherein each super-pixel in the HDR image is represented by a second number of bits, the second number being greater than the first number; and performing tone mapping on the HDR image to reduce a dynamic range of the super-pixels of the HDR image into a low dynamic range (LDR) image, wherein each pixel in the LDR image is represented with the first number of bits.

In some aspects, the M×N pixels in each pixel group include M rows and N columns of pixels.

In some aspects, M equals N, such that each pixel group is a square shape including at least four pixels.

In some aspects, the method further includes determining a quantity of the plurality of frames to capture by: determining a target dynamic range to achieve in the HDR image, wherein the target dynamic range corresponds to the second number of bits; determining a pixel-bit difference between the first number of bits and the second number of bits; determining a number of frames to capture to achieve the target dynamic range based on the pixel-bit difference; and reducing the number of frames to capture based on a quantity of pixels in each pixel group in the M×N-cell image sensor.

In some aspects, the determining the number of frames to capture to achieve the target dynamic range based on the pixel-bit difference includes: determining a first number of frames to capture as a power of the pixel-bit difference for reducing shot noises in captured frames; determining a second number of frames to capture for reducing read noise in the captured frames introduced by the M×N-cell image sensor every time a frame is captured; and determining the number of frames to capture as a sum of the first number and the second number.

In some aspects, the identifying one pixel group from each of the plurality of frames includes selecting one pixel group from a same location in each of the plurality of frames.

In some aspects, the merging the M×N pixels in each of the identified pixel groups into one super-pixel in the HDR image includes: decomposing each of the plurality of frames into a set of frequency bands using a wavelet transform algorithm; and merging pixel groups from each same frequency band using an inverse wavelet transform algorithm.

In some aspects, the techniques described herein relate to a computer-implemented method, further including: performing denoising on each wavelet band to obtain the super-pixels.

In some aspects, the identifying one pixel group from each of the plurality of frames includes: comparing one pixel group in one frame with all pixel groups in other frames to identify similar pixel groups.

In some aspects, the tone mapping includes: applying different tone mapping curves to different areas of the HDR image.

In some aspects, the tone mapping further includes: constructing a fusion tensor including a plurality of weights corresponding to the different tone mapping curves; mapping super-pixels in the HDR image to the fusion tensor to obtain corresponding fusion weights; and performing image fusion on the HDR image based on the plurality of fusion weights.

In some aspects, the techniques described herein relate to an image sensor apparatus, including: a plurality of pixel groups, each pixel group having a M×N pixels configured with color filters of a same color such that the M×N pixels in each pixel group capture a same color, wherein M and N are integers greater than one, and each pixel is represented by a first number of bits; and one or more processors configured to: capture, through the plurality of pixel groups, a plurality of frames of a scene using a short-exposure setting; merge the plurality of frames into an HDR image, wherein the merging includes: identifying one pixel group from each of the plurality of frames; and merging the M×N pixels in each of the identified pixel groups into one super-pixel in the HDR image, wherein each super-pixel in the HDR image is represented by a second number of bits, the second number being greater than the first number; and perform tone mapping on the HDR image to reduce a dynamic range of the super-pixels of the HDR image into a low dynamic range (LDR) image, wherein each pixel in the LDR image is represented with the first number of bits.

In some aspects, M equals N, such that each pixel group is a square shape including at least four pixels.

In some aspects, the one or more processors are further configured to: determine a target dynamic range to achieve in the HDR image, wherein the target dynamic range corresponds to the second number of bits; determine a pixel-bit difference between the first number of bits and the second number of bits; determine a number of frames to capture to achieve the target dynamic range based on the pixel-bit difference; and reduce the number of frames to capture based on a quantity of pixels in each pixel group in the M×N-cell image sensor.

In some aspects, to determine the number of frames to capture to achieve the target dynamic range, the one or more processors are further configured to: determine a first number of frames to capture as a power of the pixel-bit difference for reducing shot noises in captured frames; determine a second number of frames to capture for reducing read noise in the captured frames introduced by the M×N-cell image sensor every time a frame is captured; and determine the number of frames to capture as a sum of the first number and the second number.

In some aspects, to identify one pixel group from each of the plurality of frames, the one or more processors are further configured to: select one pixel group from a same location in each of the plurality of frames.

In some aspects, to identify one pixel group from each of the plurality of frames, the one or more processors are further configured to: compare one pixel group in one frame with all pixel groups in other frames to identify similar pixel groups.

In some aspects, tone mapping includes: applying different tone mapping curves to different areas of the HDR image.

In some aspects, the techniques described herein relate to a non-transitory computer-readable storage medium configured with instructions executable by one or more processors to cause the one or more processors to perform operations including: capturing, using the M×N-cell image sensor, a plurality of frames of a scene using a short-exposure setting, wherein: the M×N-cell image sensor includes a plurality of pixel groups, each pixel group having a M×N pixels configured with color filters of a same color such that the M×N pixels in each pixel group capture a same color, M and N are integers greater than one, and each pixel is represented by a first number of bits; merging the plurality of frames into an HDR image, wherein the merging includes: identifying one pixel group from each of the plurality of frames; and merging the M×N pixels in each of the identified pixel groups into one super-pixel in the HDR image, wherein each super-pixel in the HDR image is represented by a second number of bits, the second number being greater than the first number; and performing tone mapping on the HDR image to reduce a dynamic range of the super-pixels of the HDR image into a low dynamic range (LDR) image, wherein each pixel in the LDR image is represented with the first number of bits.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

BRIEF DESCRIPTION OF THE DRAWINGS

FIG. 6 illustrates an exemplary method for HDR+ using M×N-cell image sensor, according to some embodiments of this specification.

DETAILED DESCRIPTION

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown, but is to be accorded the widest scope consistent with the principles and features disclosed herein.

Figure 1A:
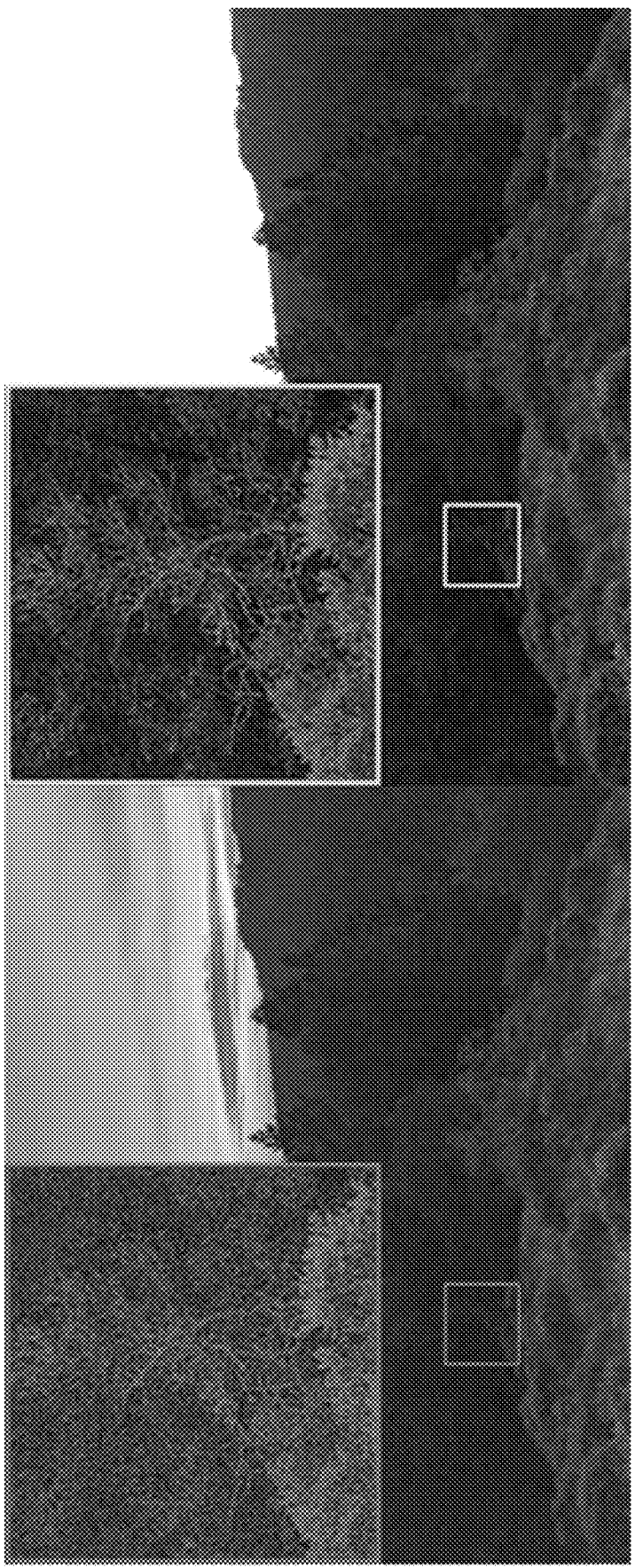
FIG. 1A illustrates a comparison between high dynamic range (HDR) using short-exposure frames and a single long-exposure frame.

In high-contrast scenes, the single-exposure Bayer pattern sensor cannot effectively reflect all details in a picture. Hence, the HDR sensor came out. The current popular HDR sensor including frame-based HDR. FIG. 1A illustrates a comparison between 101 merging multiple frames captured in different exposure settings (HDR) and 102 a single frame captured using a long exposure setting in a high-contrast scene. As shown, the single long-exposure frame has less noise in the shadows but sacrifices the high-light area, while the HDR image captures the details in the shadows (from the frames captured in the long-exposure settings) as well as the high-light area (from the frames captured in the short-exposure settings).

However, HDR has its limitations. For example, each exposure setting change of the HDR sensors must wait for the end of the previous exposure time, so it is easy to produce poor fusion effect on moving objects and cause ghosting side effect. In addition, the exposure level of each frame is different, thus the noise is also different, resulting in a fused image with a lot of noise.

Figure 1B:
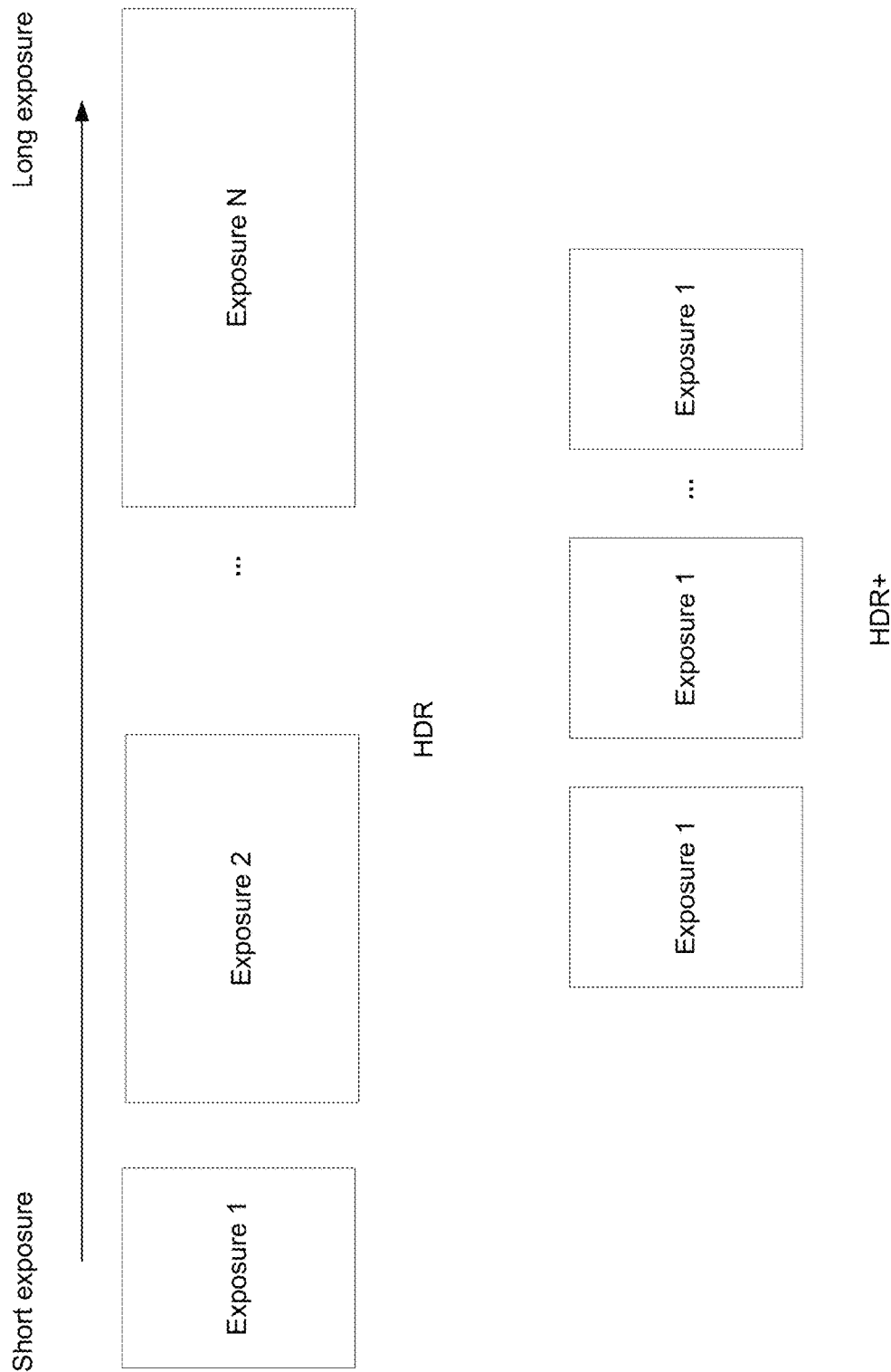
FIG. 1B illustrates a comparison between HDR and high dynamic range plus (HDR+), according to some embodiments of this specification.

To address these issues, HDR plus, denoted as HDR+, is proposed. FIG. 1B illustrates a comparison between HDR and HDR+. The HDR+ method is to shoot multiple images continuously under the same exposure on Bayer pattern, and these images will avoid overexposure of bright parts (that is, only take darker photos), and then composite these low-brightness photos into the final image. When processing multiple stacked images, since they are continuously shot at the same exposure level, the image similarity is higher and easier to calibrate.

As shown in FIG. 1B, instead of capturing multiple frames using mixed short and long exposure settings in HDR, HDR+ captures a burst of frames using the same short-exposure setting. Here, the "burst" of frames reflects the total time for capturing the frames in HDR+ is shorter than that of HDR because the short exposures are short in exposure time. After the burst of frames are captured, a processing unit (e.g., a processor on the camera, or a processor of a mobile device) may calculate the signal-to-noise ratio of the captured frames, reduce the noise in the shadows, and then enhance the shadows on the screen and reduce the highlights. This way, images with low noise, low motion blur, and high contrast may be rendered.

However, since HDR+ does not capture long-exposure frames, the dynamic range in the HDR+ images may be smaller than frame-based HDR images. Therefore, HDR+ may need to take a larger number of frames in order to achieve the same dynamic range as the frame-based HDR. However, when shooting short-exposure images to capture more frames, the overall shooting time will increase and so is the likelihood of motion bur or ghosting.

Taking a 30 fps (frame per second) image sensor as an example (i.e., the sensor can capture 30 frames per second, if one wants to increase dynamic range from 10-bit pixel values to 16-bit through HDR+, 64 images need to be captured continuously. In other words, it will take the image sensor about 2.1 seconds (64/30 sec) to finish capturing the 64 frames. This long time would lead to an unacceptably poor user experience.

Figure 2:
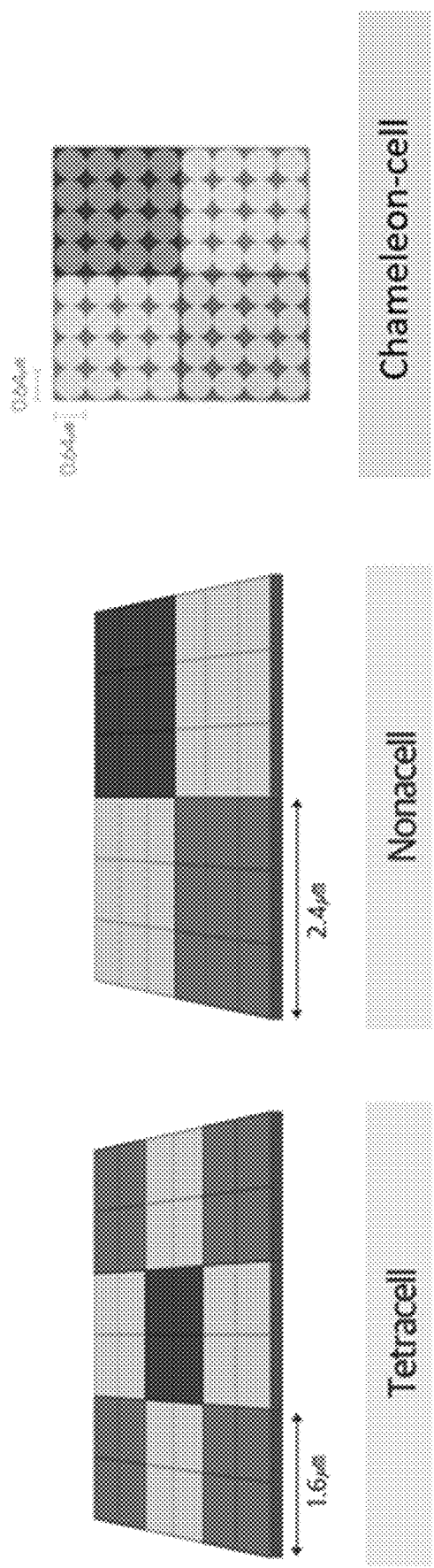
FIG. 2 illustrates exemplary M×N-cell image sensors for implementing HDR+, according to some embodiments of this specification.

This application describes using M×N-cell image sensors to help boost the frame capturing efficiency to implement HDR+. FIG. 2 illustrates exemplary M×N-cell image sensors for implementing HDR+, according to some embodiments of this specification. In this disclosure, an M×N-cell image sensor refers to a sensor with a plurality of pixel groups or pixel clusters, each pixel group having M×N pixels configured with color filters of a same color such that the M×N pixels in each pixel group capture a same color. M and N are integers greater than one. In some embodiments, M and N have the same value such that the pixel group is a square shape of pixel cluster. The M×N-cell image sensors may also be called an M-cell image sensor indicating there are M pixels (organized in a rectangle shape) in each pixel group.

As shown, a Tetracell image sensor includes 2×2 pixels in each pixel group for capturing the same color (Red, Green, or Blue), a Nonacell image sensor includes 3×3 pixels in each pixel group for capturing the same color, and a Chameleon-cell image sensor includes 4×4 pixels in each pixel group for capturing the same color. Some exemplary sizes of the pixel group or pixel in these sensors are illustrated in FIG. 2.

Still using the same example above for increasing the dynamic range from 10-bit pixel values to 16-bit through HDR+, the 4×4-cell (Chameleon-cell) sensor may only need to shoot 4 frames (with each frame including 4×4=16 pixel values) instead of 64 frames to achieve the 16-bits dynamic range, which will take 4/30=0.13 seconds. Similarly, the 3×3-cell (Nona-cell) sensor may only need to shoot 7 frames (takes 7/30 seconds), and the 2×2-cell (Tetra-cell/Quad-cell) sensor may only need to shoot 16 frames (16/30 sec) to achieve the 16-bits dynamic range.

In any of these M×N-cell image sensor-based HDR+ scenarios, the overall shooting time does not exceed 0.55 seconds. Thus, M×N-cell image sensor-based HDR+ is able to achieve a better user experience than traditional HDR+ while offering the same picture quality. A person skilled in the art would appreciate that the merge of the M×N pixel values in M×N-cell image sensor-based HDR+ would sacrifice the resolution of the image, but the sacrificed resolution was the additional benefit brought by the M×N-cell image sensors. Therefore, the resolution of the resulting images of M×N-cell image sensor-based HDR+ will be the same as that of traditional HDR+ without using M×N-cell image sensors.

Figure 3:
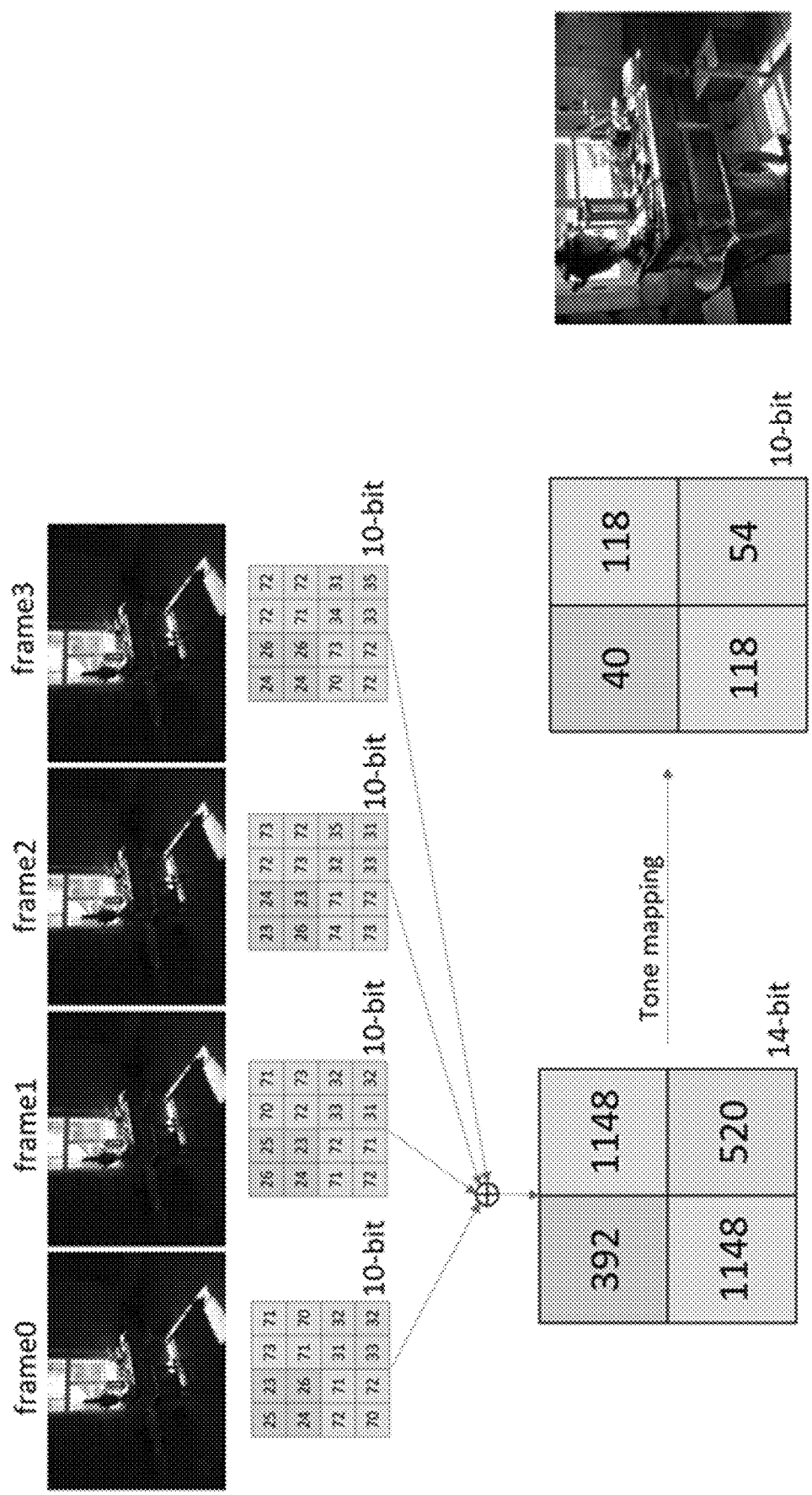
FIG. 3 illustrates an exemplary HDR+ with M×N-cell image sensors, according to some embodiments of this specification.

FIG. 3 illustrates an exemplary HDR+ with M×N-cell image sensors, according to some embodiments of this specification. As shown, the M×N-cell image sensor used in FIG. 3 has each pixel group of 2×2 pixels capturing the same color, with each pixel having a 10-bit pixel value range. In order to achieve a higher dynamic range using HDR+, such as 14-bits, multiple short-exposure frames need to be captured. In order to determine the number of frames to be captured, the size of the pixel group in the sensor is considered. For example, from 10-bit to 14-bit dynamic range, 4-bit worth of pixel values need to be captured, which is 16 pixel values (2 to the power of 4). Since each pixel group in FIG. 3 includes 2×2 (4) pixels, the total number of frames is 16/4=4 frames.

To generalize the above process, the determining the number of frames to capture using M×N-cell image sensor for HDR+ includes: (1) determining a target dynamic range to achieve (e.g., represented by a target number of pixel bits), (2) determining a pixel-bit difference between the original pixel bits in the image sensor and the target number of pixel bits; (3) determining a number of frames to capture to achieve the target dynamic range based on the pixel-bit difference; and (4) reducing the number of frames to capture based on a quantity of pixels in each pixel group in the M×N-cell image sensor.

After capturing the frames using the same short-exposure setting, the frames are merged into an HDR image. In some embodiments, the merging process may include identifying one pixel group from each of the frames; and merging the M×N pixels in each of the identified pixel groups into one super-pixel in the HDR image, each super-pixel in the HDR image is represented by the target number of pixel-bits. The merging process of the M×N pixel values from multi-frames taken from the same scene is configured to reduce noise and prevent ghosting. It may also be referred to as multi-pixels merging.

As the example shown in FIG. 3, the 10-bit pixel values of the up-left corner pixel group from all four frames are merged into one super-pixel with 14-bit pixel value range. The merging algorithm illustrated in FIG. 3 is simply summing all 16 10-bit pixel values from the corresponding pixel groups of the four frames into one 16-bit super-pixel. Other more sophisticated merging algorithms may be deployed to achieve different technical advantages.

After the merging, the generated super pixels form the high dynamic range (HDR) image. A person skilled in the art would appreciate that the merging process has a side effect: the number of effective pixels is reduced by M×N times (e.g., as M×N pixels are merged into one super pixel) and thus the resolution of the HDR image is M×N times smaller than the resolution of the each frame captured by the M×N-cell image sensor. However, there are many use cases (especially in commercial imaging products like cell phone camera, digital camera) in which the loss of resolution is acceptable while the faster generation of HDR image is preferred.

In some embodiments, after obtaining the HDR image, tone mapping operations may be executed to distribute/smoothen the bright and dark regions (e.g., maintaining local contrast while brightening shadows) on the HDR image and reduce the number of bits for representing each super pixel. The pixel-bits reduction process reverts the HDR image back to the size of the low dynamic range (LDR) image (e.g., the size of the images/frames captured by the M×N-cell image sensor) while maintaining the high dynamic range in the final image.

Figure 4:
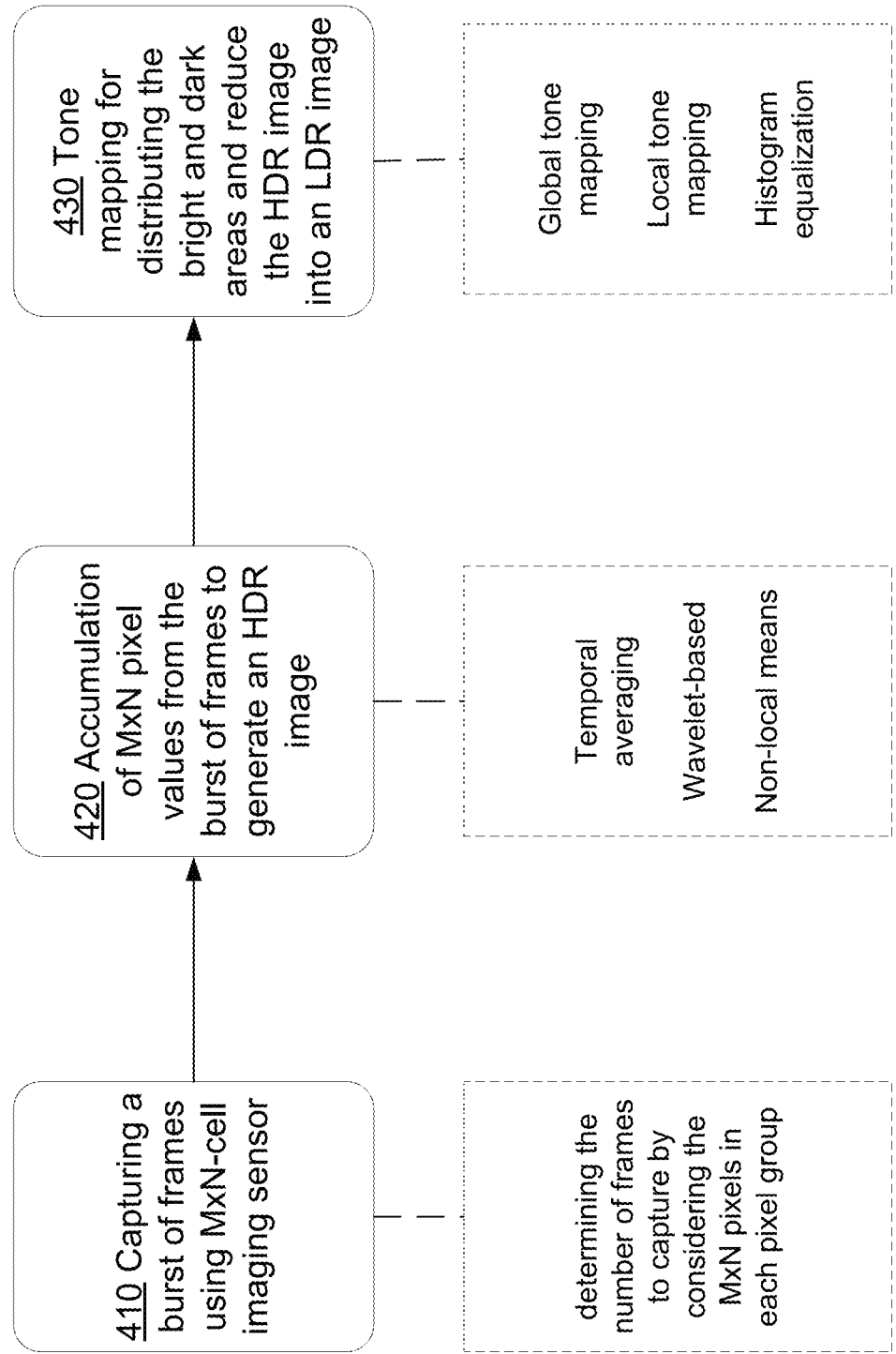
FIG. 4 illustrates an exemplary diagram for HDR+ using M×N-cell image sensor, according to some embodiments of this specification.

The exemplary process illustrated in FIG. 3 may be generalized as the workflow illustrated in FIG. 4. As shown, the workflow may start with step 410 to capture a plurality of frames of a scene using an M×N-cell image sensor in a same short-exposure setting. Since the image sensor uses the short-exposure setting, the time to capture the frames is also short compared to the traditional HDR method that uses increasing exposure settings. FIG. 4 uses the expression "a burst of frames" to show that the frames are captured quickly.

An important step for capturing the burst of frames is to determine how many frames to capture. In some embodiments, this number may be determined based on the M×N pixels in each pixel group of the image sensor and the difference between the organic dynamic range of the frames and the target dynamic range of the final image. As briefly explained above, the M×N-cell image sensor includes a plurality of pixel groups, each pixel group having M rows and N columns of pixels configured with color filters of a same color such that the M×N pixels in each pixel group capture the same color. M and N are integers greater than one and may be equal (e.g., each pixel group is a square shape of pixels), and each pixel is represented by a first number of bits. This first number of bits representing each pixel is relevant to the organic dynamic range of the frames captured by the image. Assuming the target image (i.e., the HDR image produced and displayed to the user based on the frames) needs to reach a target dynamic range (e.g., each pixel in the HDR image is represented by a second number of bits, where the second number is greater than the first number), the number of frames to be captured may be determined by (1) determining a pixel-bit difference between the first number of bits (the organic dynamic range) and the second number of bits (the target dynamic range), (2) determining the total number of frames needed based on the pixel-bit difference, and (3) reducing the total number of frames based on a quantity of pixels in each pixel group.

In some embodiments, the above step (2) may include computing a first number of frames to capture as a power of the pixel-bit difference for reducing shot noises in captured frames. In imaging, shot noise, also known as photon noise, is a type of noise that occurs due to the random nature of light. When light travels through an optical system and reaches a detector (such as a camera sensor), it arrives in discrete packets or quanta called photons. The arrival of these photons is inherently random and follows a statistical distribution known as the Poisson distribution. This randomness in the arrival of photons can result in variations in the detected signal, leading to shot noise. To reduce the shot noises, multiple frames may be captured to even out the random nature of light. Then in step (3), the total number of frames is divided by the number of pixels in each pixel group (i.e., M×N). This is because each pixel group in the image sensor is able to capture M×N frames at once shot, and all M×N frames can be used for producing the HDR image. This approach fully explored the potential of the hardware advantage of the M×N-cell image sensor.

The shot noise depends only on the total amount of light captured, i.e., the sum of N frames, each with E seconds of exposure time has the same amount of shot noise as a single frame exposed for N×E seconds. If this were the only type of noise present in captured images, burst photography would be as efficient as taking longer exposures. Unfortunately, a second type of noise, read noise, is introduced by the sensor every time a frame is captured. Read noise doesn't depend on the amount of light captured but instead depends on the number of frames taken, that is, with each frame taken, an additional fixed amount of read noise is added. Specifically, read noise occurs due to the electronic components involved in reading the signal from the detector. When the signal from the detector is read, it passes through various electronic components such as amplifiers, analog-to-digital converters, and other circuitry. These components can introduce random variations in the signal, resulting in read noise.

To address this issue, in some embodiments, the above step (2) may also include computing a second number of frames to capture for reducing read noises in the captured frames introduced by the M×N-cell image sensor every time a frame is captured, and the total number of frames include a sum of the first number of frames for reducing the shot noises and the second number of frames for reducing the read noises. Then the total number is divided by M×N to obtain the number of frames to capture using the M×N-cell image sensor using the short-exposure setting.

In step 420 of FIG. 4, the plurality of frames captured by the M×N-cell image sensor using the short-exposure setting. In some embodiments, the merging of the frames is pixel-group-based. For example, the pixel groups at the same location within the frames are merged into one super pixel. That is, each pixel group from a same location in each of the frames are selected and merged. The result of the merge (or aggregation) of the frames is an image with a high dynamic range, i.e., HDR image. Depending on the implementation, there are various ways to merge the pixels into super pixels, such as (1) Temporal averaging: this method simply averages the pixels in each M×N cell and then average the pixels in each frame, then use that average to estimate the value of each pixel in the merged frame to reduce noise; (2) Wavelet-based merging: this method involves decomposing the frames into different frequency bands using a wavelet transform algorithm, merging the pixel groups from each same frequency band using an inverse wavelet transform algorithm, and then applying denoising techniques to each wavelet band separately to construct the super-pixels; and (3) Non-local means-based merging: this method involves comparing similar patches from different M×N cells and frames of the same scene to estimate the noise level and reduce it.

In step 430 of FIG. 4, tone mapping may be performed.

Depending on the implementation, there are various ways for implementing the tone mapping operation, including: (1) Global tone mapping: this method involves applying a single tone mapping curve, for example an S-shaped contrast enhancing tone curve, to the entire image; (2) Local tone mapping: this method adjusts the brightness and contrast of an image in a localized manner, rather than globally as with traditional tone mapping techniques (e.g., the local tone mapping may include applying different tone mapping curves to different areas of the HDR image); and (3) Histogram equalization: this method involves redistributing the image pixel values to achieve a more uniform histogram. An example local tone mapping method may start with constructing a fusion tensor that includes a plurality of weights corresponding to the different tone mapping curves. The super-pixels in the HDR image are then mapped into the fusion tensor to obtain corresponding fusion weights. Subsequently, image fusion may be performed on the HDR image based on the fusion weights.

Figure 5:
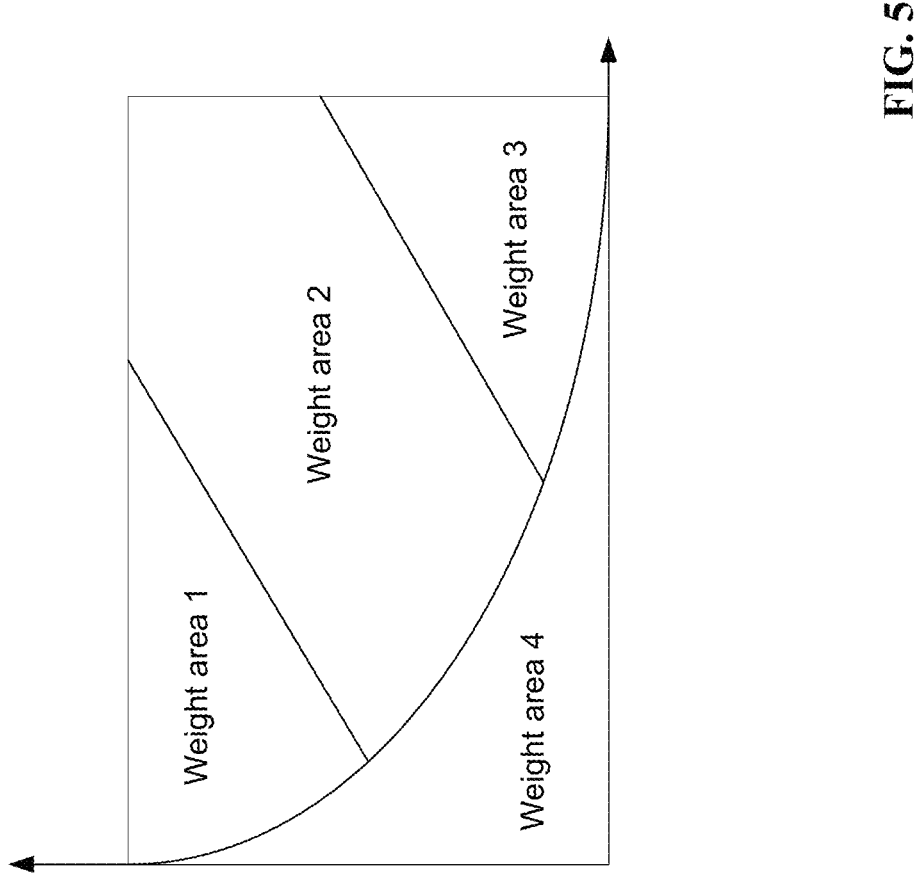
FIG. 5 illustrates an exemplary weight tensor for tone mapping, according to some embodiments of this specification.

FIG. 5 illustrates an exemplary weight tensor for tone mapping, according to some embodiments of this specification. As shown, the fusion tensor corresponding to the HDR image may be divided into multiple weight areas, each weight area may have the same weights but different weight areas may have different weights. The areas may be divided by multiple tone mapping curves.

An example fusion tensor-based tone mapping process from a 14-bit HDR image to a 10-bit LDR may start with dividing the HDR image into regions according to the fusion tensor, e.g., dividing the 14-bit HDR image into smaller regions or patches. The size of the regions may vary depending on the specific image and desired output. The process may continue to calculate the local image statistics, e.g., for each region, calculating the local image statistics such as the mean, variance, and range of pixel values. This can be done using techniques such as box filtering, Gaussian filtering, or median filtering. Then the process may apply local tone mapping, e.g., using the local image statistics to adjust the brightness and contrast of each region. This can be done using a variety of techniques such as histogram equalization, gamma correction, or contrast stretching. The goal of tone mapping to enhance the contrast and distribute the brightness in a way that preserves the visual information in each region. Subsequently, the process may include merging the regions, e.g., once each region has been processed, merging them back into a single 10-bit LDR image. This can be done by blending the patches together using techniques such as alpha blending or weighted averaging.

FIG. 6 illustrates an exemplary method for HDR+ using M×N-cell image sensor, according to some embodiments of this specification. The steps 610-630 illustrated in FIG. 6 are for illustration purposes. Depending on the implementation, the method 600 may include fewer, more, or alternative steps.

In some embodiments, the method 600 may include at least three steps 610, 620, and 630 as shown in FIG. 6. Step 610 may include capturing, using the M×N-cell image sensor, a plurality of frames of a scene using a short-exposure setting, wherein: the M×N-cell image sensor comprises a plurality of pixel groups, each pixel group having a M×N pixels configured with color filters of a same color such that the M×N pixels in each pixel group capture a same color, M and N are integers greater than one, and each pixel is represented by a first number of bits.

In some embodiments, the M×N pixels in each pixel group comprise M rows and N columns of pixels. In some embodiments, M equals N, such that each pixel group is a square shape comprising at least four pixels.

Step 620 may include merging the plurality of frames into an HDR image, wherein the merging comprises: identifying one pixel group from each of the plurality of frames; and merging the M×N pixels in each of the identified pixel groups into one super-pixel in the HDR image, wherein each super-pixel in the HDR image is represented by a second number of bits, the second number being greater than the first number. In some embodiments, the identifying one pixel group from each of the plurality of frames comprises selecting one pixel group from a same location in each of the plurality of frames. In some embodiments, the merging the M×N pixels in each of the identified pixel groups into one super-pixel in the HDR image comprises: decomposing each of the plurality of frames into a set of frequency bands using a wavelet transform algorithm; and merging pixel groups from each same frequency band using an inverse wavelet transform algorithm. In some embodiments, the step 620 may further include performing denoising on each wavelet band to obtain the super-pixels.

In some embodiments, the identifying one pixel group from each of the plurality of frames comprises: comparing one pixel group in one frame with all pixel groups in other frames to identify similar pixel groups.

Step 630 may include performing tone mapping on the HDR image to reduce a dynamic range of the super-pixels of the HDR image into a low dynamic range (LDR) image, wherein each pixel in the LDR image is represented with the first number of bits. In some embodiments, the tone mapping comprises: applying different tone mapping curves to different areas of the HDR image. In some embodiments, the tone mapping further comprises: constructing a fusion tensor comprising a plurality of weights corresponding to the different tone mapping curves; mapping super-pixels in the HDR image to the fusion tensor to obtain corresponding fusion weights; and performing image fusion on the HDR image based on the plurality of fusion weights.

In some embodiments, the method 600 may further include determining a quantity of the plurality of frames to capture by: determining a target dynamic range to achieve in the HDR image, wherein the target dynamic range corresponds to the second number of bits; determining a pixel-bit difference between the first number of bits and the second number of bits; determining a number of frames to capture to achieve the target dynamic range based on the pixel-bit difference; and reducing the number of frames to capture based on a quantity of pixels in each pixel group in the M×N-cell image sensor. In some embodiments, the determining the number of frames to capture to achieve the target dynamic range based on the pixel-bit difference comprises: determining a first number of frames to capture as a power of the pixel-bit difference for reducing shot noises in captured frames; determining a second number of frames to capture for reducing read noise in the captured frames introduced by the M×N-cell image sensor every time a frame is captured; and determining the number of frames to capture as a sum of the first number and the second number.

Figure 7:
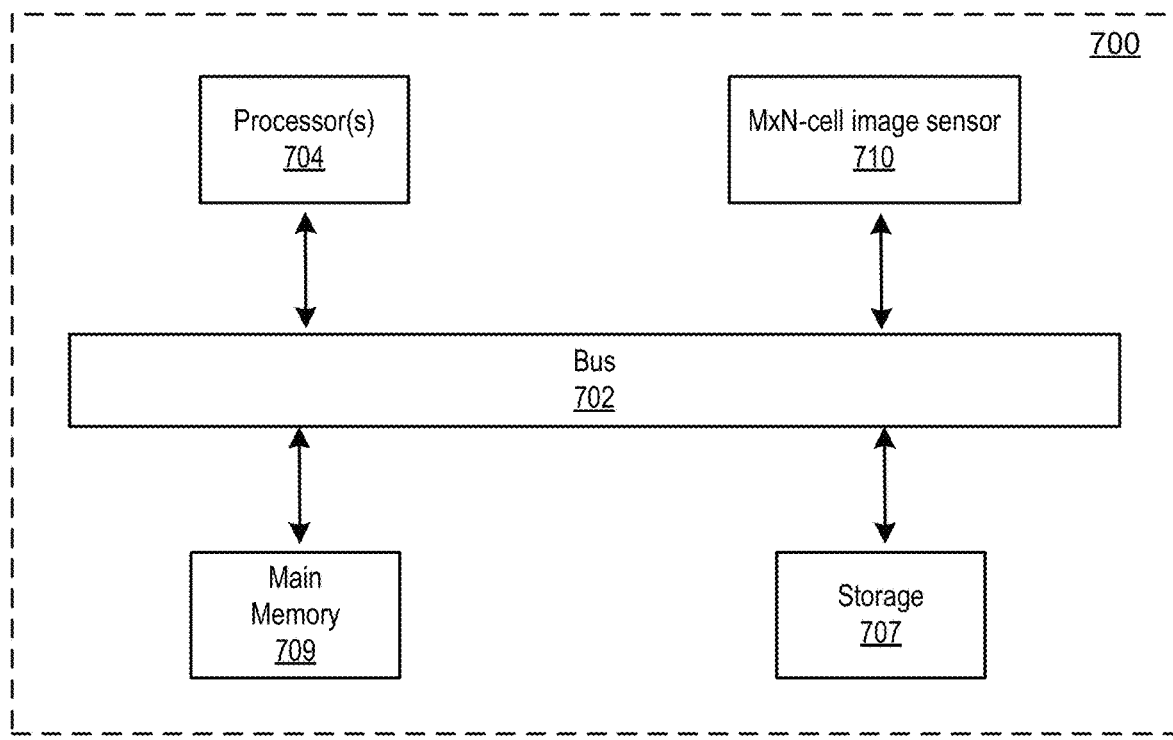
FIG. 7 is a schematic diagram of an example computing system for HDR+ using M×N-cell image sensor, according to some embodiments of this specification.

FIG. 7 is a schematic diagram of an example computing system for HDR+ using M×N-cell image sensor, according to some embodiments of this specification. The computer system 700 may be implemented in any of the components of the systems illustrated in FIGS. 1-6. One or more of the example methods illustrated by FIGS. 1-6 may be performed by one or more implementations of the computer system 700.

The computer system 700 may include a bus 702 or another communication mechanism for communicating information, and one or more hardware processor(s) 704 coupled with bus 702 for processing information. Hardware processor(s) 704 may be, for example, one or more general purpose microprocessors.

The computer system 700 may also include a main memory 709, such as a random-access memory (RAM), cache and/or other dynamic storage devices, coupled to bus 702 for storing information and instructions executable by processor(s) 704. Main memory 709 also may be used for storing temporary variables or other intermediate information during execution of instructions by processor(s) 704. Such instructions, when stored in storage media accessible to processor(s) 704, render computer system 700 into a special-purpose machine that is customized to perform the operations specified in the instructions. The computer system 700 may further include a read only memory (ROM) 709 or other static storage device coupled to bus 702 for storing static information and instructions for processor(s)

704. A storage device 707, such as a magnetic disk, optical disk, or USB thumb drive (flash drive), etc., may be provided and coupled to bus 702 for storing information and instructions.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the operations, methods, and processes described herein are performed by computer system 700 in response to processor(s) 704 executing one or more sequences of one or more instructions contained in main memory 709. Such instructions may be read into main memory 709 from another storage medium, such as storage device 707. Execution of the sequences of instructions contained in main memory 709 may cause processor(s) 704 to perform the process steps described herein. In alternative embodiments, hard-wired circuitry may be used in place of or in combination with software instructions.

The main memory 709, the ROM 709, and/or the storage device 707 may include non-transitory storage media. The term "non-transitory media," and similar terms, as used herein refers to media that stores data and/or instructions that cause a machine to operate in a specific fashion, that excludes transitory signals. Such non-transitory media may comprise non-volatile media and/or volatile media. Non-volatile media includes, for example, optical or magnetic disks, such as storage device 707. Volatile media includes dynamic memory, such as main memory 709. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 may include a M×N-cell image sensor 710 coupled to bus 702. The M×N-cell image sensor 710 may include a plurality of pixel groups, each pixel group having a M×N pixels configured with color filters of a same color such that the M×N pixels in each pixel group capture a same color.

The computer system 700 can send messages and receive data, including program code, through the network(s), network link, and M×N-cell image sensor 710. In the Internet example, a server might transmit a requested code for an application program through the Internet, the ISP, the local network, and the M×N-cell image sensor 710.

The received code may be executed by processor(s) 704 as it is received, and/or stored in storage device 707, or other non-volatile storage for later execution.

Each process, method, and algorithm described in the preceding sections may be embodied in, and fully or partially automated by, code modules executed by one or more computer systems or computer processors comprising computer hardware. The processes and algorithms may be implemented partially or wholly in the application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions that cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), or any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted or executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A method for High Dynamic Range (HDR) using M×N-cell image sensor, comprising:
    capturing, using the M×N-cell image sensor, a plurality of frames of a scene using a short-exposure setting, wherein:
        the M×N-cell image sensor comprises a plurality of pixel groups, each pixel group having M×N pixels configured with color filters of a same color such that the M×N pixels in each pixel group capture the same color,
        M and N are integers greater than one, and
        each pixel is represented by a first number of bits;
    merging the plurality of frames into an HDR image, wherein the merging comprises:
        identifying a pixel group from each of the plurality of frames; and
        merging the M×N pixels in each of the identified pixel groups into one super-pixel in the HDR image, wherein each super-pixel in the HDR image is represented by a second number of bits, the second number being greater than the first number; and
    performing tone mapping on the HDR image to reduce dynamic range of the super-pixels of the HDR image into a low dynamic range (LDR) image, wherein each pixel in the LDR image is represented with the first number of bits.

2. The computer-implemented method of claim 1, wherein the M×N pixels in each pixel group comprise M rows and N columns of pixels.

3. The computer-implemented method of claim 1, wherein M equals N, such that each pixel group is a square shape comprising at least four pixels.

4. The computer-implemented method of claim 1, wherein the method further comprises determining a quantity of the plurality of frames to capture by:
   determining a target dynamic range to achieve in the HDR image, wherein the target dynamic range corresponds to the second number of bits;
   determining a pixel-bit difference between the first number of bits and the second number of bits;
   determining a number of frames to capture to achieve the target dynamic range based on the pixel-bit difference; and
   reducing the number of frames to capture based on a quantity of pixels in each pixel group in the M×N-cell image sensor.

5. The computer-implemented method of claim 4, wherein the determining the number of frames to capture to achieve the target dynamic range based on the pixel-bit difference comprises:
   determining a first number of frames to capture as a power of the pixel-bit difference for reducing shot noises in captured frames;
   determining a second number of frames to capture for reducing read noise in the captured frames introduced by the M×N-cell image sensor every time a frame is captured; and
   determining the number of frames to capture as a sum of the first number and the second number.

6. The computer-implemented method of claim 1, wherein the identifying a pixel group from each of the plurality of frames comprises
   selecting a pixel group from a same location in each of the plurality of frames.

7. The computer-implemented method of claim 6, wherein the merging the M×N pixels in each of the identified pixel groups into one super-pixel in the HDR image comprises:
   decomposing each of the plurality of frames into a set of frequency bands using a wavelet transform algorithm; and
   merging pixel groups from each same frequency band using an inverse wavelet transform algorithm.

8. The computer-implemented method of claim 7, further comprising:
   performing denoising on each wavelet band to obtain the super-pixels.

9. The computer-implemented method of claim 1, wherein the identifying a pixel group from each of the plurality of frames comprises:
   comparing a pixel group from a first frame with all pixel groups in other frames to identify similar pixel groups.

10. The computer-implemented method of claim 1, wherein the tone mapping comprises:
    applying different tone mapping curves to different areas of the HDR image.

11. The computer-implemented method of claim 10, wherein the tone mapping further comprises:
    constructing a fusion tensor comprising a plurality of weights corresponding to the different tone mapping curves;
    mapping super-pixels in the HDR image to the fusion tensor to obtain corresponding fusion weights; and
    performing image fusion on the HDR image based on the plurality of fusion weights.

12. An image sensor apparatus, comprising:
    a plurality of pixel groups, each pixel group having M×N pixels configured with color filters of a same color such that the M×N pixels in each pixel group capture a same color, wherein M and N are integers greater than one, and each pixel is represented by a first number of bits; and
    one or more processors configured to:
    capture, through the plurality of pixel groups, a plurality of frames of a scene using a short-exposure setting;
    merge the plurality of frames into an HDR image, wherein the merging comprises:
       identifying a pixel group from each of the plurality of frames; and
       merging the M×N pixels in each of the identified pixel groups into one super-pixel in the HDR image, wherein each super-pixel in the HDR image is represented by a second number of bits, the second number being greater than the first number; and
    perform tone mapping on the HDR image to reduce a dynamic range of the super-pixels of the HDR image into a low dynamic range (LDR) image, wherein each pixel in the LDR image is represented with the first number of bits.

13. The image sensor apparatus of claim 12, wherein M equals N, such that each pixel group is a square shape comprising at least four pixels.

14. The image sensor apparatus of claim 12, wherein the one or more processors are further configured to:
    determine a target dynamic range to achieve in the HDR image, wherein the target dynamic range corresponds to the second number of bits;
    determine a pixel-bit difference between the first number of bits and the second number of bits;
    determine a number of frames to capture to achieve the target dynamic range based on the pixel-bit difference; and
    reduce the number of frames to capture based on a quantity of pixels in each pixel group in the M×N image sensor apparatus.

15. The image sensor apparatus of claim 14, wherein to determine the number of frames to capture to achieve the target dynamic range, the one or more processors are further configured to:
    determine a first number of frames to capture as a power of the pixel-bit difference for reducing shot noises in captured frames;
    determine a second number of frames to capture for reducing read noise in the captured frames introduced by the M×N image sensor apparatus every time a frame is captured; and
    determine the number of frames to capture as a sum of the first number and the second number.

16. The image sensor apparatus of claim 12, wherein to identify a pixel group from each of the plurality of frames, the one or more processors are further configured to:
    select a pixel group from a same location in each of the plurality of frames.

17. The image sensor apparatus of claim 12, wherein to identify a pixel group from each of the plurality of frames, the one or more processors are further configured to:
  compare a pixel group in a first frame with all pixel groups in other frames to identify similar pixel groups.

18. The image sensor apparatus of claim 12, wherein tone mapping comprises:
  applying different tone mapping curves to different areas of the HDR image.

19. A non-transitory computer-readable storage medium configured with instructions executable by one or more processors to cause the one or more processors to perform operations comprising:
  capturing, using a M×N-cell image sensor, a plurality of frames of a scene using a short-exposure setting, wherein:
    the M×N-cell image sensor comprises a plurality of pixel groups, each pixel group having M×N pixels configured with color filters of a same color such that the M×N pixels in each pixel group capture the same color,
    M and N are integers greater than one, and
    each pixel is represented by a first number of bits;
  merging the plurality of frames into an HDR image, wherein the merging comprises:
    identifying a pixel group from each of the plurality of frames; and
    merging the M×N pixels in each of the identified pixel groups into one super-pixel in the HDR image, wherein each super-pixel in the HDR image is represented by a second number of bits, the second number being greater than the first number; and
  performing tone mapping on the HDR image to reduce a dynamic range of the super-pixels of the HDR image into a low dynamic range (LDR) image, wherein each pixel in the LDR image is represented with the first number of bits.

20. The non-transitory computer-readable storage medium of claim 19, wherein the operations further comprise:
  determining a quantity of the plurality of frames to capture by:
  determining a target dynamic range to achieve in the HDR image, wherein the target dynamic range corresponds to the second number of bits;
  determining a pixel-bit difference between the first number of bits and the second number of bits;
  determining a number of frames to capture to achieve the target dynamic range based on the pixel-bit difference; and
  reducing the number of frames to capture based on a quantity of pixels in each pixel group in the M×N-cell image sensor.

* * * * *